April 1, 1952 C. J. BORKOWSKI ET AL 2,590,925
PROPORTIONAL COUNTER
Filed Nov. 29, 1948 3 Sheets-Sheet 1

INVENTORS
Casimer J. Borkowski
BY & Edward Fairstein

Roland A. Anderson

ATTORNEY

April 1, 1952
C. J. BORKOWSKI ET AL
2,590,925
PROPORTIONAL COUNTER
Filed Nov. 29, 1948
3 Sheets-Sheet 2
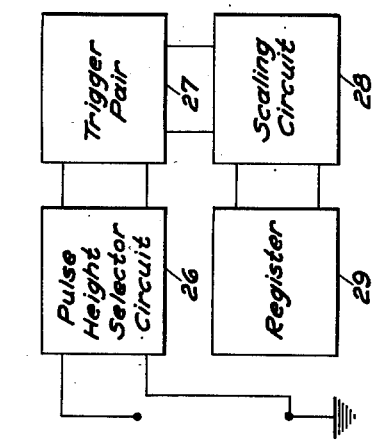
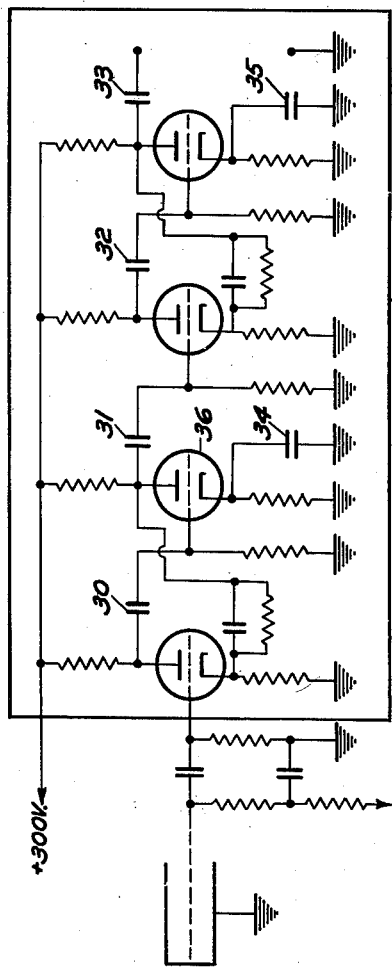
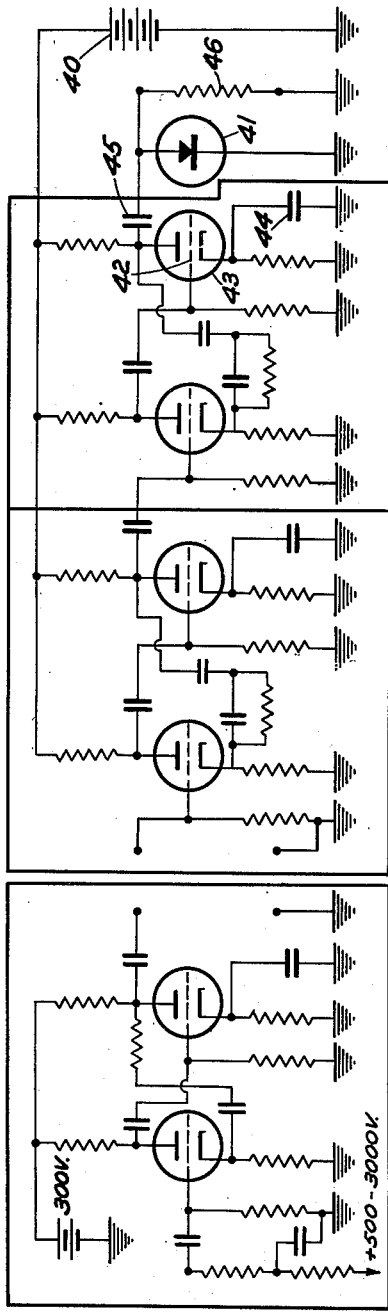
INVENTORS
Casimer J. Borkowski
&Edward Fairstein
BY
ATTORNEY April 1, 1952  C. J. BORKOWSKI ET AL  2,590,925
PROPORTIONAL COUNTER
Filed Nov. 29, 1948  3 Sheets-Sheet 3

INVENTORS
Casimer J. Borkowski
BY & Edward Fairstein

ATTORNEY

Patented Apr. 1, 1952

2,590,925

UNITED STATES PATENT OFFICE 2,590,925

PROPORTIONAL COUNTER

Casimer J. Borkowski and Edward Fairstein, Oak Ridge, Tenn., assignors to the United States of America as represented by the United States Atomic Energy Commission Application November 29, 1948, Serial No. 62,541

6 Claims. (Cl. 250—83.6)

This invention relates to instruments for detecting and measuring radiations, and especially to a proportional counting system adapted to detect and count the ionizing events produced by alpha, beta and gramma radiations, X-rays, and conversion electrons.

Figure 1:
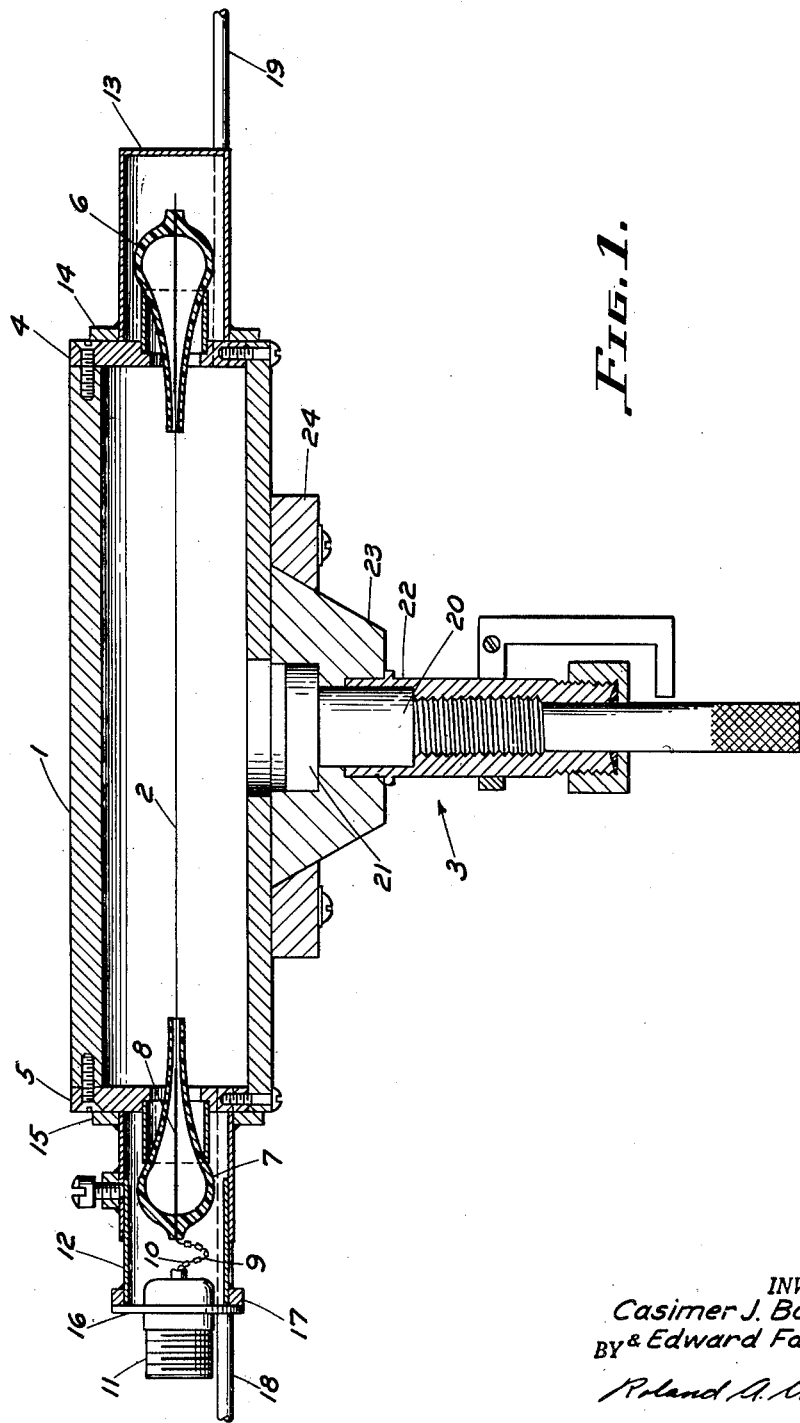
Figure 4:
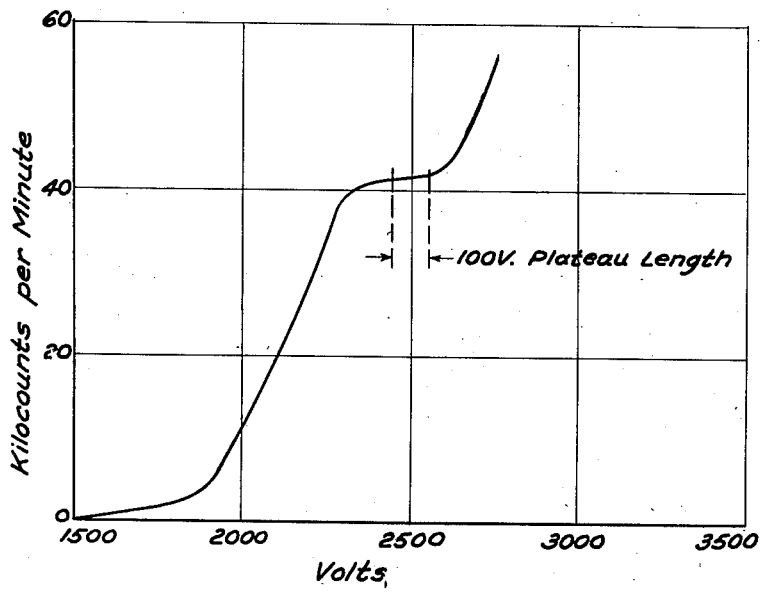
Figure 5:
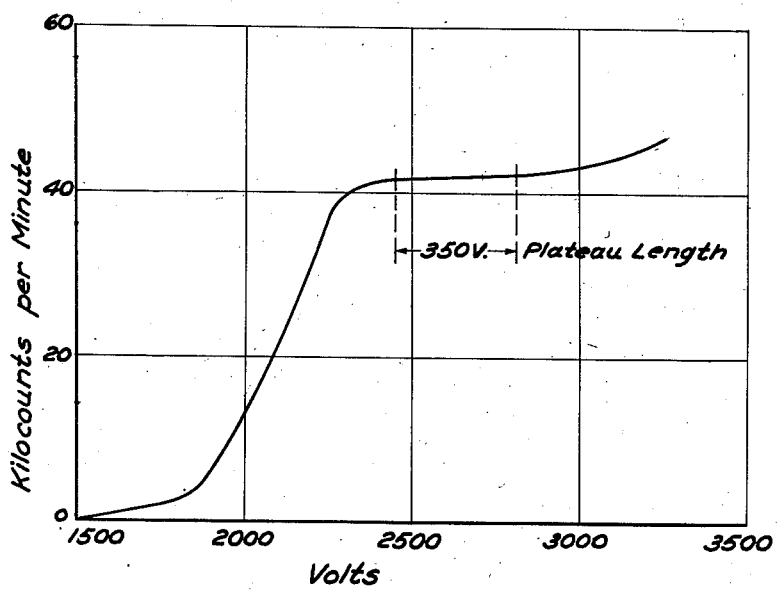

The proportional counter is an instrument which has been used extensively in the past to detect heavily ionizing particles such as alphaparticles, protons and fission fragments. By definition, a proportional counter is a counter operated within such voltage interval that the charge collected is proportional to the charge produced by the initial ionizing event, and in which the gas amplification is greater than 1. Gas amplification may be defined as the ratio of the charge collected to the charge produced by the initial ionizing event, said event being of interest in the measurement of radioactivity when it is caused by the incidence of radiation upon the sensitive volume of the counter In order that the invention be more clearly understood, a description of the construction and an explanation of the operation of a proportional counter is necessary. In the drawings, Fig. 1 is a central vertical section of one form of a proportional counter tube; Fig. 2 is a schematic representation of one form of a pulse counting system which may be employed in connection with the counter of Fig. 1, and includes the circuit diagram of one form of electronic amplifier empolyed therein; Fig. 3 is a schematic circuit diagram of a preferred form of the improved electronic amplifier employed in our proportional counting system; Fig. 4 is a curve of the relationship between counts per minute and counter voltage of the alpha counting system of Figs. 1 and 2, modified for beta and gramma counting only by the addition of a pre-amplifying stage. Fig. 5 is a curve of the same relationship for our improved counting system. Both curves were plotted using a source of low-energy beta radiations, methane gas at substantially atmospheric pressure, and a 2 mil. diameter center wire in the counter tube.

Referring now to Fig. 1, the counter tube comrises a brass cylindrical cathode 1, a tungsten wire 2, a sample inserting mechanism 3, and end plates 4, 5, secured to the ends of cylinder 1. The wire 2 extends axially within the cylinder 1, being held taut by the Kovar seals 6, 7 which extend through end plates 4, 5, respectively. The Kovar wire 8 is joined to stranded copper wire 9 carrying insulators 10, and the copper wire is secured to a connector 11. The Kovar seals and the wire lead are shielded and protected by brass housings 12, 13, which are joined to end plates 4, 5, respectively, and held in proper alignment by collars 14, 15, secured to the end plates. Connector 11 is mounted in a plate 16 at one end of the housing 12, and held in place by a collar 17 secured to both said plate and housing. Gas is caused to flow through the counter from a source bottle not shown, and is admitted to the inner volume of cylinder 1 and exhausted therefrom through copper tubes 18, 19. The sample inserting mechanism 3 comprises a spindle 20 carrying a sample platform 21 adapted to be raised into an opening in the body of cylinder 1, and to make a gas-tight fit therewith. For accurate measurements said sample platform should extend from 0.5 mm. to 1.0 mm. above the cathode surface. At this position, the geometry of the counter for alpha radiation samples is 50%; that is, the counting rate indicates 50% of the sample disintegration rate. The spindle 20 travels along barrel 22, and may be turned to lower said sample platform 21 free of said cathode surface. Slide 23 may then be pulled along guide-ways 24 exposing said sample platform and permitting access thereto for inserting or removing samples. If a charged particle of high velocity enters the cylinder volume, it collides with the gas molecules; for example, methane at 760 mm. Hg, within the chamber, and in so doing, strips electrons from them, or in other words, ionizes the molecules. The free electrons are drawn by the electrostatic voltage impressed across the counter by a potential source toward the positive counter electrode with great rapidity, such that they collide with other gas molecules with sufficient force to detach more electrons. The result of this chain of ionizations by collision is to produce a surge of many electrons to the anode where they are discharged, and a drift of positive ions toward the cathode, these events producing a voltage pulse at the anode.

Fig. 2 illustrates schematically a common method of counting the pulses produced. Each pulse is fed into an electronic amplifier 25, and thence into a pulse height selector circuit 26 which feeds a trigger pair 27, furnishing the pulse input for scaling circuit 28, the output of which is indicated by a mechanical register 29. A system of this type is illustrated in Review of Scientific Instruments 18, 884. When a radioactive sample is employed as the source of the high speed charged particles which cause the ionization described hereinbefore, the rate of occurrence of the pulses is a measure of the radioactivity of the sample.

A major advantage of proportional counting systems over, for example, Geiger-Muller type counters, is the exceedingly small dead time of the proportional counter, the dead time being the minimum time interval between successive detectable pulses. For a typical Geiger-Muller counter, this insensitive or dead time interval is of the order of 50 microseconds, while for our improved proportional counting system the interval is only 1 microsecond. Thus it is readily apparent that the proportional counter can be used to detect pulses occuring with up to 50 times the rapidity of the maximum counting rate of the Geiger-Muller counter.

A second advantage of the proportional counter over the Geiger-Muller counter in the detection of ionizing radiations is the long lifetime of the former; that is, the relatively great number of total pulses which may occur within the proportional counter before its characteristics change sufficiently to render it unusable. Our proportional counter tube has a useful lifetime of the order of 1000 times that of a typical Geiger-Muller counter, allowing us to effect a material saving in time normally required for re-filling and calibrating counter tubes.

Despite the above advantages over Geiger-Muller type counters, it has not ben practicable heretofore to use the proportional counter extensively to detect the lightly ionizing particles such as beta and gamma rays and conversion electrons, for the reasons described hereinafter.

An inherent difficulty in previously known proportional counting system is the inaccuracy resulting from the short length of the voltage plateau. That is, the counter voltage increment over which the counting rate remains substantially unchanged, for a constant source, is relatively small (see Fig. 4), and unless the counter voltage be highly stabilized to remain within that small range, the system will indicate randomly occurring wide variations in counting rate, even though exposed to radiation of constant intensity. We have found that this difficulty can be overcome in a proportional counting system by the method we set forth below, and for the reasons discussed in connection therewith.

In a proportional counter, the gas amplification changes rapidly with a variation in counter voltage. Therefore, the pulses delivered to the electronic amplifying system will be larger or smaller, depending upon a higher or lower counter voltage at the instant of the discharge within the counter. While this pulse height differential is relatively small, after an amplification of say 1000 times in the electronic amplifier, the difference in pulse heights will be substantial. We have found that the larger pulses may cause overloading of the pulse amplifier employed, so as to produce a pulse overshoot in one or more of the amplification stages. This effect will be described in detail hereinafter. We have found that the pulse overshoot thus produced may trigger the associated counting circuit in the same manner as would a legitimate pulse and therefore may cause the counting system to indicate more than the actual number of pulses.

The overall effect of random increases in pulse size and the associated pulse overshoots is to cause an undesired rise in the plateau of the curve of counting rate vs. counting voltage, and therefore to render the accuracy of the entire counting system dependent to a great extent upon a high degree of counter-voltage stabilization. Practically, it is almost impossible to achieve such stabilization using even specially regulated electrical power supplies.

Accordingly, it is an object of our present invention to provide a very accurate, reliable proportional counting system which does not require a high degree of costly counter-voltage stabilization.

It is well-known that an alpha-particle will cause more ionization as it passes through a counter than will a beta ray of equal energy, for example, see Stranathan, The Particles of Modern Physics, The Blakiston Company, 1943, p. 350. In addition, alpha particles in general possess greater energy than do the photons produced by gamma rays; therefore, the ionization produced in a proportional counter tube will normally be greatest for an alpha particle. Therefore the alpha-produced pulses may be detected with a lower gas amplification, hence a lower counter voltage, than that voltage necessary to detect beta or gamma radiation; or for a given counter voltage, greater electronic amplification is required to detect the latter two types of radiation.

Now one difficulty in prior proportional counting systems arose from the amplification necessary to count accurately the low-energy radiations. If the counter voltage were increased enough to provide the necessary gas amplification, the voltage would no longer be within the plateau, or would be so close to the end of the plateau that the accuracy of the system would depend greatly on the degree of counter voltage stabilization, for the reasons described hereinbefore. Occurrence of any of the common electrical line voltage transients would cause the counter to become no longer a precision instrument but only an approximate measuring tool. If the necessary amplification were then sought instead by electronic means, the counter voltage remaining within the plateau, we have discovered that the pulse size, as it passed through the amplifier, might at random increase to such an extent that it would cause overloading of one or more stages of the amplifiers used with previous systems. Overloading is caused by subjecting a linear amplifier to signals so large that its operation becomes non-linear, and may produce spurious signals within the amplifier. These spurious signals, we have found, were counted along with the ionization pulses by previous proportional counting systems, to such an extent as to render this approach to the problem of soft beta and gamma radiation counting, that is, increased electronic amplification, entirely too inaccurate for precision work with radioactive substances.

A brief description of the pulse overshoot phenomenon which causes the spurious counts, and the method by which we propose to minimize its effects, is necessary for the better understanding of our invention.

In a pulse amplifier such as that shown in Fig. 2, many coupling and by-pass condensers, such as 30, 34, are employed. These condensers tend to charge or discharge during each pulse, and to return to their normal charge after each pulse, thus producing electrical transients which may appear as signals following the pulse. These signals are called low-frequency overshoots, because they arise from failure of the condensers to act as short circuits at low frequencies. If in the amplifier of Fig. 2 even a minute overshoot is produced in the first amplification stage and delivered to the control grid of tube 36, capacitor 34 will charge during the pulse, and discharge to normal operating potential at the end of the pulse, and will produce an overshoot at the output of tube 36 equal to the sum of the two. As the signal is successively amplified in the stages of the amplifier, the overshoot reaches sufficient magnitude to act as a separate pulse, and even to cause further overshoots.

Theoretically, the overshoots due to condenser action could be eliminated by making all time constants of the amplifier circuit large enough.

However, there is a practical limit to the maximum values of resistances and condensers which may be employed, and it has been generally considered impossible to build a high gain amplifier producing no overshoots at all by this means.

In view of the above stated shortcomings of previous proportional counting systems, and with a knowledge of the technical difficulties involved, we have as a primary object of our invention the provision of a proportional counting system having a relatively long voltage plateau characteristic. We propose to obtain this long voltage plateau by use of one of certain filling gases and by eliminating substantially all of the spurious counts caused by pulse overshoot in the amplifier.

One form of an amplifier with which we propose to accomplish this purpose is illustrated in Fig. 3. 37 is a preamplifier stage having a voltage gain of substantially fifteen, while 38 and 39 are feedback-pairs, each pair having a voltage gain of approximately 10–30. Tube operating voltages and currents may be furnished by a voltage source such as a rectified and filtered electronic power supply, but a battery 40 is indicated for the sake of clarity and brevity, and filament connections are omitted from each tube. A conventional electronically regulated power supply furnishes the ionization chamber potentials, which may be variable from substantially 500 to 3000 volts.

In the operation of our system, a radioactive sample of for example, $C^{14}$, which is a low-energy beta emitter, is placed on the sample platform 21 of Fig. 1, and the platform is raised into position in the opening in cylinder 1. Methane gas, for example, is caused to flow through the tube in the familiar manner. The appropriate switches are closed to apply the electronic circuit voltages and the potential across the counter tube. As previously described, voltage pulses will occur at the wire 2, and these pulses will be amplified in pre-amplifier 37. They further feed into amplifiers 38 and 39, and are applied to the rectifier 41 and resistor 46 which are shunted across the output terminals of the amplifier 39. Since the pulse size and the overshoot is largest in the last stage of the amplifier, that is, in 39, the tendency to produce spurious counts will be larger in this stage than in any of the preceding stages. We have found that a circuit element, such as a thermionic diode tube, or preferably a germanium diode rectifier, which has a high resistance to current flow in one direction and a low resistance to flow in the reverse direction, when connected across the output terminals of the last amplification stage, will effectively prevent any pulse overshoot in the output of said last stage. Suppose for example, that a positive pulse having a negative overshoot is received upon grid 42. A negative pulse will result at the plate of tube 43, then the pulse will tend to overshoot in the positive direction as capacitor 44 charges and the previous negative overshoot is incident on control grid 42. Diode 41 will act substantially as an open circuit to the negative pulse applied through coupling condenser 45, hence will allow it to pass on to the pulse height selector unchanged. But when the positive overshoot pulse is applied to the diode through condenser 45, current will flow from plate to cathode of said diode and partially discharge said condenser, restoring the D. C. potential at its output to substantially the same potential as before the pulse was applied. All capacitors in the last stage will return to normal operating charge during the restoring action described above, so that there will be no secondary overshoot added by said final stage to that incident upon its input. The pulse height selector circuit, which may be of a conventional type illustrated in Review of Scientific Instruments 18, 884, may be adjusted so that a 0.25 volt pulse having a pulse width of $10^{-6}$ seconds is the minimum pulse which will operate the circuit. The pulse overshoot has been so eliminated or minimized by the use of restoring rectifier 41 that it is not of sufficient magnitude to operate said pulse height discriminator, yet the pulses caused by incident low energy radiation have been so amplified that they may be counted accurately.

Thus it is readily apparent that we have found a method for providing sufficient amplification of the small initial signals produced by low energy radioactive radiations to enable them to be counted accurately, and we have, nevertheless, prevented the large signals ordinarily produced by the same amplification of relatively large initial ionization pulses from causing spurious signals large enough to be counted by our counting circuit, over a wide voltage plateau. By accomplishing those two objectives, we are able to provide a proportional counting system which will indicate with precision the radioactivity of low-energy and low ionizing power radiations such as those emitting soft beta and soft gamma radiations, yet also will count with precision the activity of emitters of radiations of high energy and/or high ionizing power, such as alpha particles.

The improved performance characteristics of our invention are evidenced by the curves of Figs. 4 and 5. It may be seen that we have provided a proportional counting system having a voltage plateau with less than 1% change in counting rate for 350 volts, using 99% pure methane gas and a $C^{14}$ sample. Using the well-known methane flow counter tube of Fig. 1 and the associated circuits of Fig. 2, with a sample of $C^{14}$, and 99% pure methane gas, a voltage plateau of roughly 100 volts was obtained. Then using the same counter tube, gas, and sample, and the same associated circuits, except for substituting our improved amplifier of Fig. 3 for the amplifier of Fig. 2, we obtained a voltage plateau with less than 1% rise in counting rate in 350 volts. Substantially the same length plateaus were obtained when the methane was replaced by another of the saturated hydrocarbons, butane and propane, or by a mixture of a noble gas such as argon with one of the saturated hydrocarbons. The voltage plateaus occurred over different counter tube voltage ranges for each different gas or combination thereof. Thus it is apparent that we have more than tripled the voltage plateau of a prior proportional counting system, and thereby have provided two urgently needed improvements: (1) we had provided, in place of a randomly inaccurate counting system for radiations of low ionizing power, a precision counting system for those radiations as well as for those of high ionizing power, which gives accurate, reproducible results; (2) we have eliminated the need for costly high voltage stabilization equipment for the counter tube potential without reducing counter accuracy. A conventional electronically-regulated power supply furnishes satisfactory voltage regulation for our system.

It is to be understood that our invention is not to be limited by the use of the counter tube described herein, but may be employed with any configuration of counter tube, providing the quenching gas is a commercially pure polyatomic gas, such as methane, or a mixture of a polyatomic gas with not more than 95% by volume of a noble gas. In addition it is understood that the method illustrated of counting the amplified pulses, as indicated in Fig. 2, is not to be construed in a limiting sense. Although our invention has been described with particular reference to one improved electronic amplifier, it is apparent that there are other methods of design of amplifiers described in the literature which would be applicable for the necessary pulse amplification and overshoot reduction. Our invention rather lies in the combination of known elements to produce a previously unknown, novel, and useful result; that is, a proportional counting system having as a characteristic of its operation a relatively long voltage plateau of less than 1% rise in counting rate. That change in characteristic effectively removes the proportional counter from the class of costly inaccurate instruments of limited practical use, and renders it a precision instrument suitable for all forms of accurate radiation detection and measurement.

Having thus described our invention, we claim:

1. In combination with a proportional counter employing as a filling gas a mixture of a polyatomic gas with not more than 95% by volume of a noble gas, an amplifying system comprising at least one electric discharge device having an anode, a control grid, and a cathode, an input circuit connected to said grid and said cathode, and an output circuit adapted to substantially eliminate the pulse overshoot tending to occur therein, and including resistance means and rectifying means in parallel combination and capacitance means coupling one junction of said parallel combination to said anode, the opposite junction of said parallel combination being connected to a point of substantially constant potential.

2. In combination with a source of substantially constant electrical potential and a source of radioactive radiations, means for measuring the intensity of said radiations comprising a proportional counter tube employing methane as a filling gas, and electrical means for amplifying the magnitude of the pulses which occur within said counter tube due to said radiation to a predetermined magnitude while producing substantially no additional pulses at the output thereof, said electrical means including an electric discharge tube having an anode, a grid, and a cathode electrodes, input and output circuits associated therewith, said output circuit including capacitance means coupled to one of said electrodes, and a diode shunted by resistance means coupled between said capacitance means and a point of constant potential.

3. In combination, a proportional counter tube employing as a filling gas a saturated hydrocarbon and a pulse amplifying device adapted to introduce substantially no extraneous pulses to the pulses impressed upon the input thereof, comprising a plurality of electric discharge devices arranged in cascade for successive amplification of pulses, and each having at least an anode, a cathode, and a control grid electrodes, input and output circuits associated with each of said devices, and overshoot-reducing means connected in at least one of said output circuits including capacitance means; resistance means and rectifying means in parallel combination, said capacitance means coupling one of said electrodes in said output circuit to a junction of said parallel combination, the opposite junction being connected to a point of substantially constant potential, and said rectifying means being so oriented as to conduct current when a pulse of a selected polarity is impressed upon it, whereby the potential across said capacitance is maintained substantially constant while said pulse is impressed thereon, but not while a pulse of opposite polarity is impressed thereon.

4. In combination with a proportional counter employing a substantially pure polyatomic filling gas, an amplifying system comprising at least one electric discharge device having an anode, a control grid, and a cathode, an input circuit connected to said grid and said cathode, and an output circuit adapted to substantially eliminate the pulse overshoot tending to occur therein, and including resistance means and rectifying means in parallel combination and capacitance means coupling one junction of said parallel combination to said anode, the opposite junction of said parallel combination being connected to a point of substantially constant potential.

5. In a counter system including a proportional counter and a pulse amplifier including a plurality of electric discharge devices having input and output circuits associated therewith, the combination of a polyatomic filling gas for said counter and circuit means in said amplifier for suppression of spurious pulses caused by pulse overshoot, comprising a rectifier connected across said output circuit of at least one of said discharge devices.

6. In a counter system including a proportional counter and a pulse amplifier including a plurality of electric discharge devices having input and output circuits associated therewith, the combination of a filling gas for said counter comprising a mixture of a noble gas with at least 5% by volume of a polyatomic gas, and circuit means in said amplifier for suppression of spurious pulses caused by pulse overshoot, comprising a rectifier connected across said output circuit of at least one of said discharge devices.

CASIMER J. BORKOWSKI.
EDWARD FAIRSTEIN.

REFERENCES CITED

The following references are of record in the file of this patent:

UNITED STATES PATENTS

| Number | Name | Date |
|---|---|---|
| 2,355,363 | Christaldi | Aug. 8, 1944 |
| 2,399,135 | Miller et al. | Apr. 23, 1946 |
| 2,434,297 | Test et al. | Jan. 13, 1948 |
| 2,457,781 | Metten et al. | Dec. 28, 1948 |
| 2,462,140 | Spicer | Feb. 22, 1949 |

OTHER REFERENCES

Wilkening et al., Physical Review, vol. 62, pg. 536.

Lewis, Electrical Counting, Macmillan Co., New York, pgs. 74, 75 and 89, 1943.

Korff, Electron and Nuclear Counters, D. Van Nostrand Co., Inc., New York, pgs. 13–15, 74, 75 and 107.